United States Patent [19]

Umehara

[11] Patent Number: 4,826,114
[45] Date of Patent: May 2, 1989

[54] PIPE AND CLAMP COMBINATION

[75] Inventor: Kazumasa Umehara, Shizuoka, Japan

[73] Assignee: Usui Kokusai Sangyo Kaisha Ltd., Shizuoka, Japan

[21] Appl. No.: 181,962

[22] Filed: Apr. 15, 1988

[30] Foreign Application Priority Data

May 15, 1987 [JP] Japan .................. 62-72456[U]

[51] Int. Cl.$^4$ .............................. F16L 3/08
[52] U.S. Cl. .................. 248/74.1; 24/339; 24/563
[58] Field of Search ............... 248/49, 58, 68.1, 74.1, 248/74.2, 316.7, 500, 505; 24/563, 339; 403/206, 207, 209; 285/61, 64

[56] References Cited

U.S. PATENT DOCUMENTS

| | | | |
|---|---|---|---|
| 1,673,789 | 6/1928 | Nolte | 248/58 |
| 1,968,596 | 7/1934 | Benander | 248/74.1 |
| 2,159,188 | 5/1939 | Vollmer | 248/49 |
| 2,517,411 | 8/1950 | Patterson | 248/505 |
| 2,683,578 | 7/1954 | Rainey | 248/68.1 |
| 3,202,291 | 8/1965 | Root | 248/500 |
| 3,441,986 | 5/1969 | Pritchard | 248/68.1 |
| 3,486,531 | 12/1979 | Nalodka | 24/339 |
| 4,445,255 | 5/1984 | Olejak | 248/74.1 |
| 4,683,895 | 8/1987 | Pohndorf | 248/505 |

FOREIGN PATENT DOCUMENTS

| | | | |
|---|---|---|---|
| 509552 | 1/1955 | Canada | 248/74.2 |
| 414755 | 8/1934 | United Kingdom | 248/74.1 |

Primary Examiner—J. Franklin Foss
Assistant Examiner—Robert A. Olson
Attorney, Agent, or Firm—Anthony J. Casella; Gerald E. Hespos

[57] ABSTRACT

A combination of at least one pipe and a plurality of clamping members for construction a pipeline. The pipe includes a plurality of diametrically deformed portions each having a partly circular cross section defining at least one recessed flat wall portion and a pair of shoulders located at the opposite ends, respectively, of the flat wall portion which are spaced apart from each other along the length of the pipe. The clamping members are spaced apart from one another along the pipe. Each clamping member is formed from a strip and is folded back at least at one end thereof to form a partly cylindrical wall fitted about one of the diametrically deformed portions of the pipe and held between the shoulders.

7 Claims, 1 Drawing Sheet

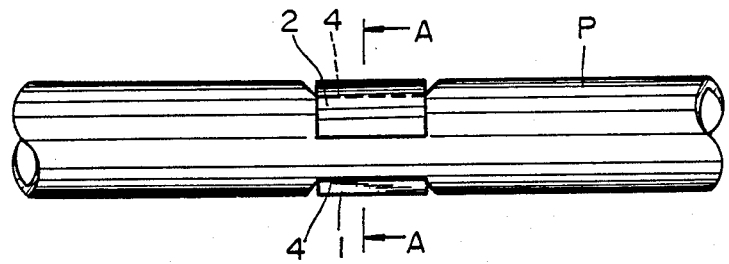
Fig. 1
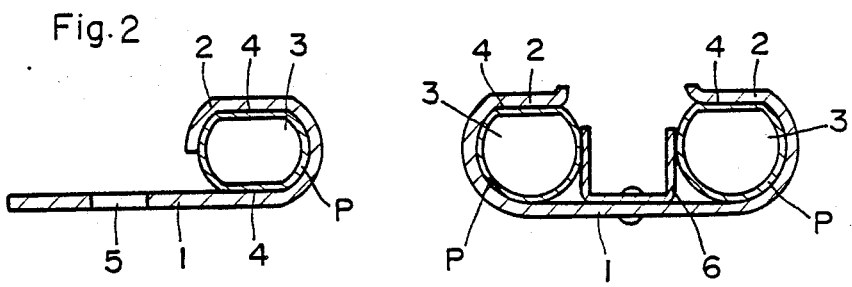
Fig. 2
Fig. 3
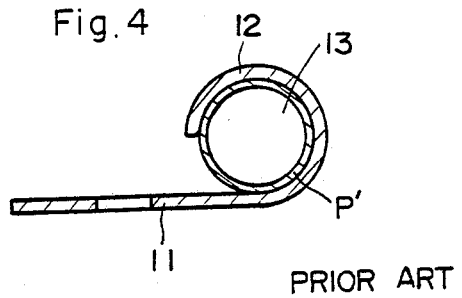
Fig. 4
PRIOR ART

PIPE AND CLAMP COMBINATION

BACKGROUND OF THE INVENTION

1. Field of the Invention

This invention relates to a combination of at least one pipe having a relatively small inside diameter not exceeding, say, 20 mm and a plurality of clamping members for constructing a pipeline which is used for supplying fuel, oil, etc. to an automobile, machine or apparatus, for drawing out air to establish a vacuum in a machine or apparatus.

2. Description of the Prior Art

A known pipeline construction of the type to which this invention pertains is shown by way of example in FIG. 4. It comprises a pipe P' having a circular cross section along its entire length and a plurality of clamping members 11 spaced apart from one another along the pipe, of which only one is shown. Each clamping member 11 is formed from a strip of an appropriate material and is bent at one end to form a partly cylindrical wall 12 fitted about the cylindrical outer surface of the pipe P' for holding it, as shown at 13. This known construction has, however, a serious drawback which is due to the cylindrical wall 12 of the clamping member 11 fitted about the cylindrical surface of the pipe P'. The vibration of the automobile, machine or apparatus with which the pipeline is associated is likely to cause the clamping member 11 to displace itself to some extent along the pipe P', especially after the pipeline has been subjected to such vibration for a certain length of time. As a result, the clamping member 11 may scratch the pipe P', and it is often likely that the wall of the pipe may eventually have a hole if it has a small thickness.

SUMMARY OF THE INVENTION

It is, therefore, an object of this invention to provide an improved pipeline construction which can prevent the displacement of any clamping member and thereby the scratching of a pipe leading to the formation of a hole through its wall, even if the pipeline may be subjected to vibration for a long period of time.

This object is attained by a combination of at least one pipe including a plurality of diametrically deformed portions each having a partly circular cross section and defining at least one recessed flat wall portion and a pair of shoulders located at the opposite ends, respectively, of the flat wall portion which are spaced apart from each other along the length of the pipe, and a plurality of clamping members each formed from a strip and having at least at one end thereof a partly cylindrical bent wall fitted about the outer surface of one of the diametrically deformed portions of the pipe.

The clamping member fitted about each diametrically deformed portion of the pipe is held between the shoulders and is, therefore, not displaceable along the pipe.

If each clamping member has such a bent wall at each end thereof, it can hold two parallel pipes together.

Other features and advantages of this invention will be apparent from the following description and the accompanying drawings.

BRIEF DESCRIPTION OF THE DRAWING

FIG. 1 is a fragmentary side elevational view of a pipeline construction embodying this invention;

FIG. 2 is a sectional view taken along the line A—A of FIG. 1;

FIG. 3 is a view corresponding to FIG. 2, but showing a construction according to another embodiment of this invention; and FIG. 4 is a view corresponding to FIG. 2, but showing the prior art.

DETAILED DESCRIPTION OF THE INVENTION

A pipeline construction embodying this invention is fragmentarily shown in FIGS. 1 and 2. It comprises a pipe P and a plurality of clamping members 1 spaced apart from one another along the pipe P and each formed from a strip, though only one clamping member 1 is shown. The pipe P includes a plurality of diametrically deformed portions spaced apart from one another along its length and each having a partly circular cross section which defines a pair of diametrically opposite recessed flat wall portions and a pair of shoulders located at the opposite ends, respectively, of each flat wall portion which are spaced apart from each other along the length of the pipe P. Each clamping member 1 is folded back at one end thereof to form a partly cylindrical wall 2 fitted closely about the outer surface of one of the diametrically deformed portions 3 of the pipe P and held between the shoulders. Each clamping member 1 also has a hole 5 apart from its partly cylindrical wall 2, so that, for example, a bolt extending therethrough may secure the clamping member 1 to a base, for example, a part of a machine.

A pipeline construction according to another embodiment of this invention is shown in FIG. 3. It is basically identical to the construction shown in FIGS. 1 and 2 and therefore, only the features which differentiate it from the construction of FIGS. 1 and 2 will now be described. According to the construction of FIG. 3, each clamping member 1 has a pair of partly cylindrical walls 2 at the opposite ends, respectively, thereof for holding two pipes P together. Each diametrically deformed portion 3 of each pipe P has only one recessed flat wall portion 4. Each cylindrical wall 2 of each clamping member 1 has a cross sectional shape which is somewhat different from that of its counterpart shown in FIG. 2. A central holding member 6 having a U-shaped cross section is disposed between the two pipes P for holding them against displacement out of the cylindrical walls 2, respectively, of the clamping member 1. The holding member 6 may, for example, be riveted to the clamping member 1.

In either event, the clamping members fitted about the partly recessed wall portions of the pipe or pipes are effectively held by the shoulders against any displacement along the pipe or pipes. Therefore, there does not occur any scratching of the pipe or pipes.

What is claimed is:

1. A pipe and clamp combination for constructing a pipeline which comprises:

at least one pipe having a generally circular cross section along a major portion of the length of said pipe, said pipe including at least one diametrically deformed portion having at least one recessed flat wall portion and a pair of shoulders located at opposite longitudinal ends, respectively, of said flat wall portion, said shoulders being spaced apart from each other along the length of said pipe; and a clamping member for each said diametrically deformed portion of said pipe, each said clamping member being formed from a strip, each of said clamping members being folded back at least at one end thereof to form at least one flat wall fitted about one of said diametrically deformed portions of said pipe and held between said shoulders thereof.

2. A combination as set forth in claim 1 wherein said diametrically deformed portion further comprises a partly circular cross section, and wherein each said clamping member is formed to define a partly cylindrical wall adjacent said flat wall for generally conforming to the shape of said diametrically deformed portion of said pipe.

3. A combination as set forth in claim 2, wherein each of said clamping members is provided at each of two opposite ends thereof with said cylindrical wall for holding two parallel pipes together.

4. A combination as set forth in claim 3, further including a holding member having a U-shaped cross section and disposed between said two pipes.

5. A combination as set forth in claim 4, wherein said holding member is riveted to each of said clamping members.

6. A combination as set forth in claim 1 wherein each of said diametrically deformed portions has a pair of diametrically opposite recessed flat wall portions.

7. A combination as set forth in claim 3, wherein each of said diametrically deformed portions has a pair of diametrically opposed recessed flat wall portions.

* * * * *